3,064,049
TRI-HYDROXY-NAPHTHANILIDES

Robert J. Cox, Chenango Bridge, N.Y., assignor to General Aniline & Film Corporation, New York, N.Y., a corporation of Delaware
No Drawing. Filed Dec. 23, 1959, Ser. No. 861,437
3 Claims. (Cl. 260—560)

This invention relates to novel compounds for use as couplers or coupling components in the production of diazotype images. In particular, the invention relates to such coupling components derived from naphthanilide.

In the diazotype process, an azo dye image is produced as a result of a coupling reaction between a color-forming component and a light sensitive diazo compound. A light sensitive diazotype element based on the above reaction comprises a support or base having applied thereto a light sensitive diazo compound which is destroyed or otherwise altered upon exposure to light so as to render it incapable of reacting with an azo coupling component to form an azo dye image. Since the product of the coupling reaction is an azo dye, diazotype images are consequently produced in a variety of colors depending, of course, on the choice of coupling components and diazo compounds. There are many instances, however, wherein an essentially neutral black diazotype image is desired. Since, as previously pointed out, azo dyes are invariably colored, the production of neutral diazotype images necessitates employing mixtures of suitable coupling components in order to achieve the desired spectral response. Thus, in an effort to produce images that absorb in all the visible range, it is a common practice in the art to employ a mixture of coupling components one of which, on color coupling, produces a yellow dye and the other a blue dye. However, such simulated black images have heretofore not proved entirely satisfactory. It has, for instance, been difficult to the present time to produce neutral black diazotype images over a wide exposure range. That is to say, at certain levels of exposure, the color balance is not preserved so that a degraded partially colored image is obtained rather than the desired neutral one. Such a defect is manifested as a degraded black image having a decided reddish or purplish aspect, and is, therefore, objectionable wherein a true neutral print is demanded.

It is, therefore, the purpose and object of this invention to provide a new and novel coupling component which, on color coupling in the diazotype process, produces a blue image which, when combined with a yellow azo dye image, will produce a neutral black diazotype image.

Other objects will be apparent as the description of the invention proceeds.

It has been discovered that the aforesaid objects can be accomplished by using as a source of a blue azo dye image a color coupling component of the type depicted formulistically below:

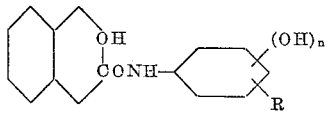

wherein $n$ is an integer of from 1 to 2 and R is hydrogen or an alkyl group such as methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, and the like.

Coupling components which are representative of the above general formula include the following structures:

(1) 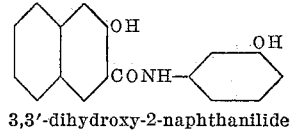
3,3'-dihydroxy-2-naphthanilide (2) 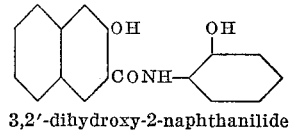
3,2'-dihydroxy-2-naphthanilide (3) 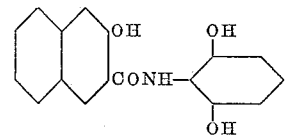
3,2',6'-trihydroxy-2-naphthanilide (4) 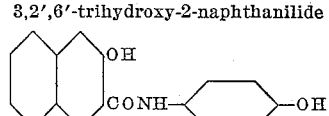
3,4'-dihydroxy-2-naphthanilide (5) 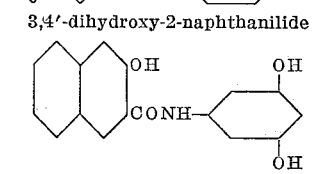
3,3',5'-trihydroxy-2-naphthanilide (6) 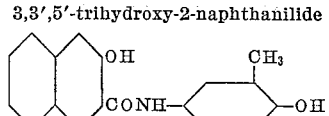
3,4'-dihydroxy-3'-methyl-2-naphthanilide (7) 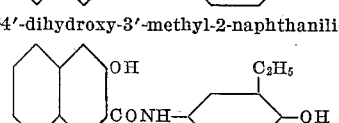
3'-ethyl-3,4'-dihydroxy-2-naphthanilide (8) 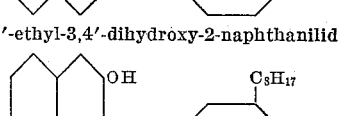
3,4'-dihydroxy-3'-octyl-2-naphthanilide (9) 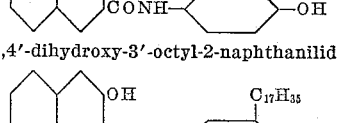
3'-heptadecyl-3,4'-dihydroxy-2-naphthanilide In general, the naphthanilide coupling components of the type contemplated herein are prepared by reacting an aminophenolic compound with 3-hydroxy-2-naphthoyl halide followed by isolating the resulting compound employing techniques common to the field of organic chemistry.

In the following examples, which are inserted for the purpose of illustration only and are not to be construed as placing any limitation on the invention, details are presented for the preparation of my individual naphthanilide coupling components.

EXAMPLE I

3-3'-Dihydroxy-2-Naphthanilide

A slurry of 515 g. of m-aminophenol and 464 g. of 3-hydroxy-2-naphthoyl chloride in 4600 ml. of benzene was heated on a steam bath with stirring and refluxing for six hours. The reaction mixture was cooled, filtered, and the precipitate washed with benzene and dried. The dry precipitate was slurried with 6 N hydrochloric acid, filtered, washed with water, and then dissolved in aqueous sodium hydroxide. The sodium hydroxide solution was made acid with 6 N hydrochloric acid and the resulting precipitate filtered, washed with water, and dried in a vacuum desiccator. A white solid was obtained in 72% yield which melted at 229–32° after recrystallization from 2-propanol and had the following structure:

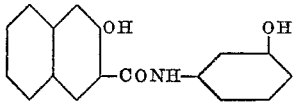

Analysis.—Calcd. for $C_{17}H_{13}NO_3$: C, 73; H, 4.6; N, 5.0. Found: C, 72.9; H, 4.6; N, 4.9.

EXAMPLE II

3,2'-Dihydroxy-2-Naphthanilide

A slurry of 961 g. of 3-hydroxy-2-naphthoyl chloride, 508 g. of o-aminophenol, and 494 g. of anhydrous sodium carbonate in 9335 ml. of benzene was refluxed with stirring on a steam bath for 20 hours. The reaction mixture was cooled to room temperature, filtered, washed with a little benzene, and air dried. The precipitate was dissolved in 5 liters of water containing 500 ml. of 50% sodium hydroxide solution, Super Cel was added, and the mixture filtered. The filtrate was acidified with hydrochloric acid and the resultant precipitate filtered, washed with a little water, and air dried. The white solid, after recrystallization from a 2-propanol-benzene mixture, weighed 465 g. (36% of theory), melted at 211°–13°, and had the structure:

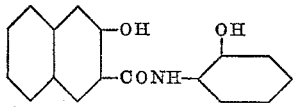

Analysis.—Calcd. for $C_{17}H_{13}NO_3$: C, 73.1; H, 4.6; N, 5.0. Found: C, 73.02; H, 4.78; N, 5.19.

EXAMPLE III

3,2'6'-Trihydroxy-2-Naphthanilide

A solution in pyridine of 2-aminoresorcinol, prepared by the catalytic reduction of 32 g. (0.2 mole) of 2-nitroresorcinol with a palladium on carbon catalyst under 50 lbs. initial hydrogen pressure, was heated with stirring to 80°. A solution of 41.2 g. (0.2 mole) of 3-hydroxy-2-naphthoyl chloride in 500 cc. of benzene was added dropwise and the reaction mixture was stirred at 80° for 16 hours. The benzene was distilled from the mixture and the residue poured onto cracked ice which had been made acidic with hydrochloric acid. A dark oil precipitated which crystallized on standing had a melting point of 246–8° after recrystallization from a water-ethanol mixture, weighed 25.5 g., and had the following structure:

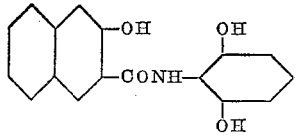

Analysis.—Calcd. for $C_{17}H_{13}NO_4$; N, 4.75. Found: N, 4.61.

EXAMPLE IV

3,3',5'-Trihydroxy-2-Naphthanilide

A solution of 22.7 g. (0.11 mole) of 3-hydroxy-2-naphthoyl chloride in 500 ml. of benzene was added dropwise to a well agitated solution of 17.8 g. (0.11 mole) of 5-aminoresorcinol in 350 ml. of pyridine at 80–90°. This temperautre was maintained for 5 hours and the reaction mixture was allowed to stand overnight at room temperature. The benzene was distilled off the reaction solution and the residue poured into ice water which was made slightly acidic with hydrochloric acid. A gum which solidified on standing was filtered, washed well with water, and dried in a vacuum desiccator. It melted at 115–18°, weighed 26.8 g., and had the structure:

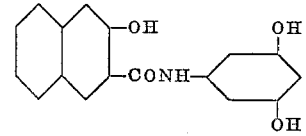

EXAMPLE V

3,4'Dihydroxy-2-Naphthanilide

A slurry of 22.9 g. of p-aminophenol and 20.6 g. of 3-hydroxy-2-naphthoyl chloride in 200 ml. of benzene was stirred and heated to reflux for 6 hours. The reaction mixture was allowed to cool to room temperature, filtered, the precipitae washed with benzene, and air dried. It was then slurried with 6 N hydrochloric acid, filtered, dissolved in aqueous sodium hydroxide solution, filtered again, and reprecipitated with hydrochloric acid. The solid was filtered, washed with water, and dried in a vacuum over sodium hydroxide. It weighed 6.4 g. and a sample, after recrystallization from ethanol, melted at 268–70° and had the structure:

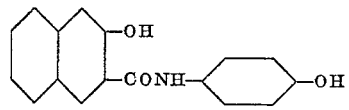

Analysis.—Calcd. for $C_{17}H_{13}NO_3$: C, 73.1; H, 4.6; N, 5.0. Found: C, 72.94; H, 4.59; N, 4.98.

EXAMPLE VI

3,4'-Dihydroxy-3'-Methyl-2-Naphthanilide

A slurry of 20.6 g. of 3-hydroxy-2-naphthoylchloride, 34.4 g. of 4-amino-2-methylphenol sulfate and 31.8 g. of sodium carbonate in 200 ml. of benzene was heated to reflux with stirring for 3 hours. The reaction mixture was cooled to room temperature, filtered, air dried, and slurried in dilute hydrochloric acid. This slurry was filtered, the precipitate washed with water, then dissolved in aqueous sodium hydroxide solution, filtered once more, and the filtrate made acidic with hydrochloric acid. The precipitate was filtered, washed with water, and dried in a vacuum over sodium hydroxide. It weighed 14.6 g., melted at 208–11° after recrystallization from benzene, and had the following structure:

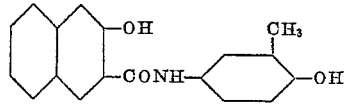

EXAMPLE VII

The 3-hydroxy-2-naphthoyl chloride used in the examples given above was prepared according to J. Gen. Chem. (U.S.S.R.) 8, 357–64 (1938), by refluxing 661 g. of 3-hydroxy-2-naphthoic acid and 546 g. of thionyl chloride in 3200 ml. of carbon tetrachloride on a steam bath for 4 hours. The carbon tetrachloride was partially removed under reduced pressure and the reaction mixture cooled. The yellow acid chloride, M. 97–100°, was recrystallized from carbon tetrachloride. A yield of 64% of 3-hydroxy-2-naphthoyl chloride was obtained.

EXAMPLE VIII

This example illustrates a method of using my novel compounds in the diazotype process.

A solution of the following composition was made up:

| | Grams |
|---|---|
| Methyl Cellosolve solvent | 90 |
| Cellulose acetatebutyrate | 2 |
| Sulfosalicylic acid | 1.5 |
| Zinc chloride | 0.2 |
| 3,3'-dihydroxy-2-naphthanilide (Formula 1) | 0.4 |
| m,m'-(ethylenedioxy) diphenol | 2.0 |
| 4-chlororesorcinol | 0.25 |
| p-diethylaminobenzenediazonium fluoborate | 0.7 |
| 2,5 - diethoxy - 4 - morpholinobenzenediazonium zincichloride | 0.7 |

This solution was coated on a cellulose acetate base and, upon exposure under a positive original to actinic light followed by development with moist ammonia vapors, a positive neutral black diazotype image was obtained. This image has a very high reprint opacity to actinic light.

Modifications of my invention will occur to persons skilled in the art. I, therefore, do not intend to be limited in the patent granted except as necessitated by the appended claims.

I claim:

1. A compound having the following structural formula:

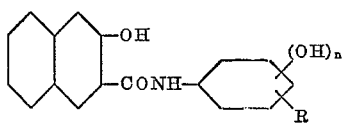

wherein R is selected from the group consisting of an alkyl residue of from 1 to 17 carbon atoms and hydrogen and $n$ represents the numeral 2.

2. 3,2',6'-trihydroxy-2-naphthanilide.
3. 3,3',5'-trihydroxy-2-naphthanilide.

References Cited in the file of this patent

UNITED STATES PATENTS

| 2,022,579 | Turski | Nov. 26, 1935 |
| 2,023,591 | Hitch et al. | Dec. 10, 1935 |
| 2,025,116 | Lubs et al. | Dec. 24, 1935 |
| 2,410,397 | Weiss et al. | Oct. 29, 1946 |
| 2,635,536 | Murray | Apr. 21, 1953 |
| 2,754,286 | Martin | July 10, 1956 |

FOREIGN PATENTS

| 917,024 | Germany | Aug. 23, 1954 |
| 818,299 | Great Britain | Aug. 12, 1959 |

OTHER REFERENCES

Van Allen: Jour. American Chemical Society, vol. 69, pages 2913–14 (1947).

Dunn: Journal of the Society of Dyers and Colourists, vol. 73, pages 92–94 (1957).